C. B. MILLS.
DYNAMO ELECTRIC MACHINE.
APPLICATION FILED JAN. 5, 1918.
1,343,221.
Patented June 15, 1920.
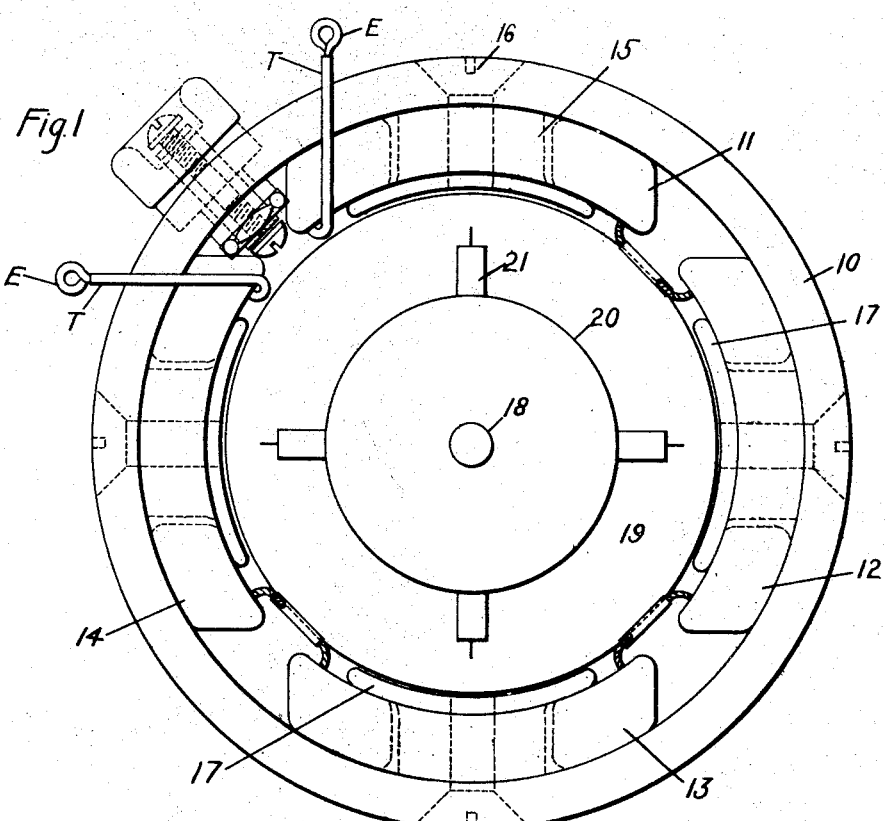
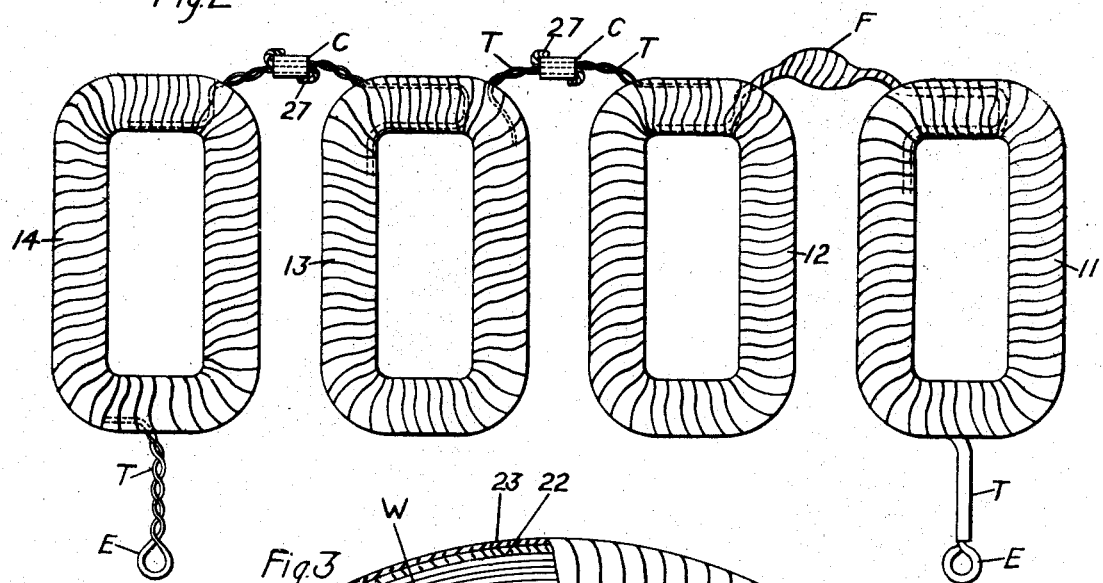
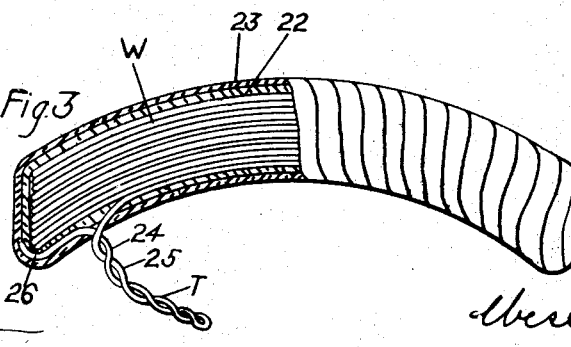
WITNESSES:
W. S. Reece
E. L. Greenewald
INVENTOR
Chester B. Mills
BY
Wesley G. Carr
ATTORNEY

UNITED STATES PATENT OFFICE.

CHESTER B. MILLS, OF EAST McKEESPORT, PENNSYLVANIA, ASSIGNOR TO WESTINGHOUSE ELECTRIC & MANUFACTURING COMPANY, A CORPORATION OF PENNSYLVANIA.

DYNAMO-ELECTRIC MACHINE.

1,343,221.     Specification of Letters Patent.     Patented June 15, 1920.

Application filed January 5, 1918. Serial No. 210,522.

*To all whom it may concern:*

Be it known that I, CHESTER B. MILLS, a citizen of the United States, and a resident of East McKeesport, in the county of Allegheny and State of Pennsylvania, have invented a new and useful Improvement in Dynamo-Electric Machines, of which the following is a specification.

My invention relates to dynamo-electric machines and more particularly to the terminals and terminal connections of the field coils of automobile generators and motors.

The shunt field coil wires of automobile generators are so small that the ends frequently break off because of vibration of the cars upon which such generators are mounted.

Ordinarily, the connections between the coils of the field winding are made by soldering short pieces of flexible cable to the terminals of such coils. I have discovered that breakages may be practically avoided by bending back the end of the field-coil wire upon itself and twisting the two adjacent parts together. The inner free end of the doubled wire is buried in the field coil casing so as to take the strain from the single wire. The objects and novel features of my invention will be apparent from the following description, taken in connection with the drawing, in which Figure 1 is an end view of an automobile generator equipped with a shunt field winding embodying my invention; Fig. 2 is a plan view illustrating the shunt field coils and the connections between the terminals of the individual coils, and Fig. 3 is an end view of one of the field coils, part of the same being shown in section to illustrate the manner of anchoring the free end of the wire of the terminal.

Referring to Fig. 1, 10 designates a tubular steel field frame of an automobile generator, supporting therein the shunt field winding of the generator consisting of the field coils 11, 12, 13 and 14, which surround the field pole pieces 15, held in place in the frame 10 by screws 16. Each of the field pole pieces has a curved pole face or shoe 17 that engages the inner side of the field coil carried thereby to hold the coil in place. A shaft 18 is rotatably mounted within the frame 10 and carries the armature 19 and commutator 20, the latter having brushes 21 bearing thereon.

Each of the field coils consists of a large number of turns of enameled copper wire of small size; as a specific example, the coils herein shown consisting of 144 turns of #17 enameled copper wire. The wire coils are wound upon a rectangular frame and, when a sufficient number of turns have been wound to complete the coils, the same is wrapped with cotton tape to constitute an insulating casing, two layers 22 and 23 of tape being shown about the winding W of Fig. 3. Sufficient lengths of the wire are left free at the ends of the coil to constitute its terminals.

The ends of the wire that project from the coil are doubled or bent back upon themselves and the adjacent doubled parts 24 and 25 are then twisted about each other, as illustrated in Fig. 3. The free end 26 of the bent-back part 24 is of sufficient length to extend inwardly for a distance around the inner layer of tape 22 and is then surrounded by the outer tape 23, it being thus embedded in the casing and anchored in place against the body of the coil. The part 24 is thereby secured, at its inner end, so that it will take part of the strain to which the terminal is subjected.

The parts of the automobiles, trucks and other vehicles upon which these generators are mounted are often subjected to severe vibration which has caused breakages of the terminals of the field coils, usually at the points where they project from the casing. A terminal constructed according to my invention avoids the foregoing disadvantages, since a single wire is not subjected to all of the strains and the doubled wire will more readily withstand the ordinary vibrations of an automobile. The inner ends 26 of the terminals T may be extended to any convenient distance within the taping, as illustrated in the different coils of Fig. 2.

When the individual coils are connected in series to form the shunt field winding of the generator, the terminals of the intermediate coils, at corresponding ends, are secured together by means of the sleeve connectors C through which the ends of the adjacent terminals T project. The extremities of the terminals may be bent around and outside the opposite ends of the connector C to form hook-like ends 27, thereby more securely connecting the terminals together.

The connector C and its associated terminals may be soldered together to form a more perfect electrical joint. The soldered-together terminals and connectors are, when finished, taped as shown at F in Fig. 2. In some constructions, the sleeve connector C may be omitted and the ends of the doubled terminals may be bent to form hooks and then hooked together and soldered.

The outer field coils 11 and 14 are electrically connected, at one end, to the adjacent intermediate coils 12 and 13, respectively, by the connectors C in the manner just described, and the other ends of the windings of the coils 11 and 14 are provided with terminals T' formed by bending back and twisting together the adjacent parts of the wire, as illustrated in Fig. 3, an eye or loop E being provided adjacent the bend at the extremity of these terminals, whereby the terminal may be fitted over a binding post or screw.

It will be apparent, from the foregoing description, that I have provided a terminal for field coils that is reinforced to avoid breakages and also has considerable flexibility.

While I have described the invention in detail, it is to be understood that I do not wish to be limited to the exact construction, as changes may be made therein without departing from the spirit of the invention as set forth in the appended claims.

I claim as my invention:

1. In an electrical coil, the combination with a winding of insulated wire and a layer of insulating material therefor, of a flexible terminal projecting from the insulating material, said terminal comprising one end of said wire bent back upon itself and twisted about the adjacent portion for the greater part of the length of the bent-back portion, the free end of said bent-back portion being laid adjacent to said coil on said layer of insulating material, and a second layer of insulating material covering said first layer and the free end of the wire.

2. In an electrical coil, the combination with a winding of insulated wire and a two-layer insulating casing therefor, of a flexible terminal projecting through said casing, said terminal comprising one end of said wire bent back upon itself and twisted about the adjacent portion and having a free end of wire, the integral end of said terminal being covered by two layers of insulation and the free end of said terminal being covered by one layer of insulation.

3. An automobile generator field winding comprising a plurality of wire coils and two-layer insulating casings therefor, said coils having reinforced flexible terminals, each terminal comprising the integral end of a wire bent back upon itself and twisted about the adjacent portion for the greater part of the length of the bent-back portion, the looped end of said terminal projecting from said insulating casing and the free end of each wire being placed between the two layers of insulating material.

In testimony whereof, I have hereunto subscribed my name this 22nd day of Dec. 1917.

CHESTER B. MILLS.